UNITED STATES PATENT OFFICE.

ISAAC P. WENDELL, OF PHILADELPHIA, PENNSYLVANIA.

COMPOUND FOR AXLE-BEARINGS.

SPECIFICATION forming part of Letters Patent No. 305,123, dated September 16, 1884.

Application filed September 12, 1883. (No specimens.)

*To all whom it may concern:*

Be it known that I, ISAAC P. WENDELL, a citizen of the United States, residing at Philadelphia, in the county of Philadelphia and State of Pennsylvania, have invented certain new and useful Improvements in Compounds for Axle-Bearings, of which the following is a specification.

My invention has for its object to provide an inexpensive, extremely hard and durable compound, which in itself is to a degree a self-lubricant for axle or journal bearings, piston-packings, car-axle-box dust-shields, and other like articles, and for similar or other desired purposes.

My invention accordingly consists of a compound composed of silicate of soda, asbestus, and sulphur for the principal ingredients, to which may be added, if desired, a quantity of black-lead and paraffine or other lubricating oil.

In combining the ingredients the silicate of soda, asbestus, and sulphur are first well mixed together, and the black-lead and lubricant are then added and the mass stirred and mixed until all its component parts are thoroughly intermingled to form the compound, which is then subjected to heat or pressure in a mold, or otherwise, as desired, to harden and fashion it into the shape designed for use.

The asbestus employed may be either in a pulverized condition or in the form of a fiber; but I prefer to use a mixture of fibered and pulverized asbestus, so as to make the compound more dense.

The silicate of soda serves as an indurating medium for the asbestus, and the sulphur has a tendency to vulcanize the compound.

Instead of employing both the black-lead or plumbago and paraffine or other lubricating-oil, they may both be dispensed with or used singly, as desired.

In combining the ingredients I do not confine myself to any stated proportions, as they may be varied as desired according to the skill and judgment of the compounder, governed, of course, by the use to which the compound is to be applied. Thus when it is to be employed for axle or journal bearings, or other purposes where it will be subject to constant wear and pressure, the proportion of silicate of soda and sulphur may be in excess of the amount of asbestus used, in order to harden the compound; but where the latter is to be employed for packing, dust-shields, or other purposes where it will not be exposed to pressure, then only so much of the silicate is mixed with the asbestus and sulphur as will be necessary to bind them into a compact mass.

What I claim is—

1. A new composition of matter consisting of asbestus and sulphur combined with an indurating material, substantially as described.

2. As a new article of manufacture, a compound composed of silicate of soda, asbestus, and sulphur, as herein set forth.

3. A compound consisting of silicate of soda, asbestus, sulphur, and a lubricant, substantially as described.

4. The herein-described compound, consisting of asbestus, sulphur, a lubricant, and an indurating medium, substantially as set forth.

In testimony whereof I affix my signature in presence of two witnesses.

ISAAC P. WENDELL.

Witnesses:
S. J. VAN STAVOREN,
CHAS. F. VAN HORN.